US008926189B2

(12) United States Patent
Delos et al.

(10) Patent No.: US 8,926,189 B2
(45) Date of Patent: Jan. 6, 2015

(54) ROLLING BEARING DEVICE FOR STEERING COLUMN

(75) Inventors: Jacques Delos, Desmonts (FR); Bruno Montboeuf, Cerelles (FR)

(73) Assignee: Aktiebolaget SKF, Gothenburg (SE)

( * ) Notice: Subject to any disclaimer, the term of this patent is extended or adjusted under 35 U.S.C. 154(b) by 346 days.

(21) Appl. No.: 13/392,532

(22) PCT Filed: Jul. 28, 2010

(86) PCT No.: PCT/EP2010/060972
§ 371 (c)(1),
(2), (4) Date: May 11, 2012

(87) PCT Pub. No.: WO2011/023485
PCT Pub. Date: Mar. 3, 2011

(65) Prior Publication Data
US 2012/0210819 A1    Aug. 23, 2012

(30) Foreign Application Priority Data

Aug. 28, 2009   (FR) ..................................... 09 55887

(51) Int. Cl.
| F16C 19/16 | (2006.01) |
| F16C 33/58 | (2006.01) |
| F16C 35/063 | (2006.01) |
| B62D 1/16 | (2006.01) |
| F16C 25/08 | (2006.01) |
| F16C 33/38 | (2006.01) |

(52) U.S. Cl.
CPC ............... *B62D 1/16* (2013.01); *F16C 19/163* (2013.01); *F16C 25/08* (2013.01); *F16C 33/3806* (2013.01); *F16C 33/3843* (2013.01); *F16C 35/063* (2013.01); *F16C 33/588* (2013.01); *F16C 2326/24* (2013.01)
USPC ............................................ 384/539; 74/492

(58) Field of Classification Search
USPC ...................................... 74/492; 384/539, 535
See application file for complete search history.

(56) References Cited

U.S. PATENT DOCUMENTS

| 2,483,013 A | * | 9/1949 | Kopprasch ...................... 310/90 |
| 4,881,629 A | | 11/1989 | Valeo |
| 6,287,013 B1 | * | 9/2001 | Loncar et al. ................. 384/539 |

FOREIGN PATENT DOCUMENTS

| DE | 10300725 A1 | 7/2004 |
| DE | 102005018244 A1 | 11/2005 |
| EP | 0806582 A2 | 11/1997 |
| EP | 1164300 A1 | 12/2001 |
| EP | 1988002 A1 | 11/2008 |
| FR | 2869081 A1 | 10/2005 |
| FR | 2870302 A1 | 11/2005 |
| JP | 2007009940 A | 1/2007 |
| WO | WO03095853 A1 | 11/2003 |
| WO | WO2004063577 A2 | 7/2004 |

* cited by examiner

*Primary Examiner* — William C Joyce
(74) *Attorney, Agent, or Firm* — Bryan Peckjian; SKF USA Inc. Patent Department

(57) ABSTRACT

The rolling bearing device (1), in particular for a motor vehicle steering column, comprises an outer race (2), an inner race (3), rolling elements (4) placed between the outer race (2) and inner race (3). The inner race comprises a plurality of retaining tongues (6) directed radially inwards suitable for coming into contact with a tube or a shaft (7).

11 Claims, 8 Drawing Sheets

ROLLING BEARING DEVICE FOR STEERING COLUMN

CROSS-REFERENCE

This application is the US national stage of International Application No. PCT/EP2010/060972 filed on 28 Jul., 2010, which claims the benefit of French Patent Application Serial No. 0955887, filed on 28 Aug., 2009, both of which are incorporated herein in their entireties.

The invention relates to the field of rolling bearings, notably rolling bearings used in motor vehicle steering columns.

Usually, steering column rolling bearings comprise an outer race, an inner race, each race comprising a toroidal raceway, and an array of rolling elements such as balls placed between the two raceways in contact with the latter. A cage is placed in the bearing to keep an even circumferential space between the balls. The cage is usually made of a moulded synthetic material.

The outer rolling races are secured to an outer tube of the steering column and the inner races are mounted on the column shaft by means of a tolerance ring or sleeve which makes it possible to easily install the bearing on the shaft without initial clamping and then to carry out the connection between the inner race and the shaft, even when the sections of the shaft and of the inner race have a very different profile. For this, the tolerance ring is provided with radially deformable elastic elements.

The tolerance ring is preferably made of an electrically conductive material, allowing, amongst other things, a low-intensity current to pass between the fixed portion and the rotating portion of the column, via the outer race, the balls and the inner race. This may, for example, be used for the electrical connection of the control of a horn, the said control often being situated on the rotating portion of the steering wheel.

The German Patent Application DE 103 00 725-A1 discloses such a rolling bearing comprising a metal sleeve allowing the bearing to be installed on the steering column shaft. A lock washer, also mounted on the shaft, has a certain radial elasticity allowing it to clamp onto the shaft by the wedge effect of conical portions of the sleeve in the inner race. The axial force necessary to cause an effective clamping of the sleeve onto the shaft is relatively high and its intensity difficult to control. Moreover, the placement of the lock washer after that of the sleeve on the assembled bearing constitutes an additional operation and therefore increased costs.

European Patent Application EP 1 988 002 in the name of the applicant also discloses a rolling bearing for a steering shaft column in which the metal sleeve is placed in the inner race and comprises tongues which are capable, by wedge effect with the inner race, of clamping radially inwards so as to attach in rotation the inner race and the shaft without using a lock washer. However, the sleeve has a relatively complex shape which is difficult to manufacture. This therefore leads to an increase in the costs and therefore an increase in the total cost of the rolling bearing.

The object of the invention is therefore to alleviate the aforementioned drawbacks by proposing a rolling bearing, particularly suitable for a motor vehicle steering column, with a simple structure and capable of being manufactured at reasonable cost prices. A subject of the invention is also a rolling bearing ensuring a sufficient preload capable of securely attaching in rotation the inner race to the steering column shaft.

In one embodiment, a rolling bearing device, in particular for a motor vehicle steering column, comprises an outer race, an inner race and rolling elements placed between the outer and inner races. The inner race comprises a plurality of retaining tongues directed radially inwards, suitable for coming into contact with a steering column tube or shaft.

Preferably, the rolling bearing also comprises a cage for retaining the rolling elements, furnished with at least one first hook for axially holding the cage relative to the outer race.

The cage may be furnished with at least one second hook for axially holding the cage relative to the inner race.

The cage may have a first axial annular portion in which the first hooks are made and a second annular portion axially opposite to the first and in which the second hooks are made.

According to another embodiment, the cage may have an annular lug directed radially inwards and interacting, for the axial retention of the inner race, with at least one retaining tongue made on the inner race.

The cage may have an axial annular portion in which the first hooks are made.

The inner race may have an axial annular portion in which the retaining tongues are made.

The inner race is preferably made of an electrically conductive material and may be obtained by stamping a flank of thin metal sheet.

A motor vehicle steering column comprising an inner tube or shaft and an outer tube may be fitted with at least one rolling bearing device as described above mounted between the said inner tube or shaft and the outer tube.

Advantageously, the inner tube or shaft of the steering column may have a peripheral groove capable of interacting with the retaining tongues of the inner race of the rolling bearing device.

The present invention will be better understood on reading the description of a number of embodiments given as examples which are in no way limiting and are illustrated in the appended drawings.

Figure 1:
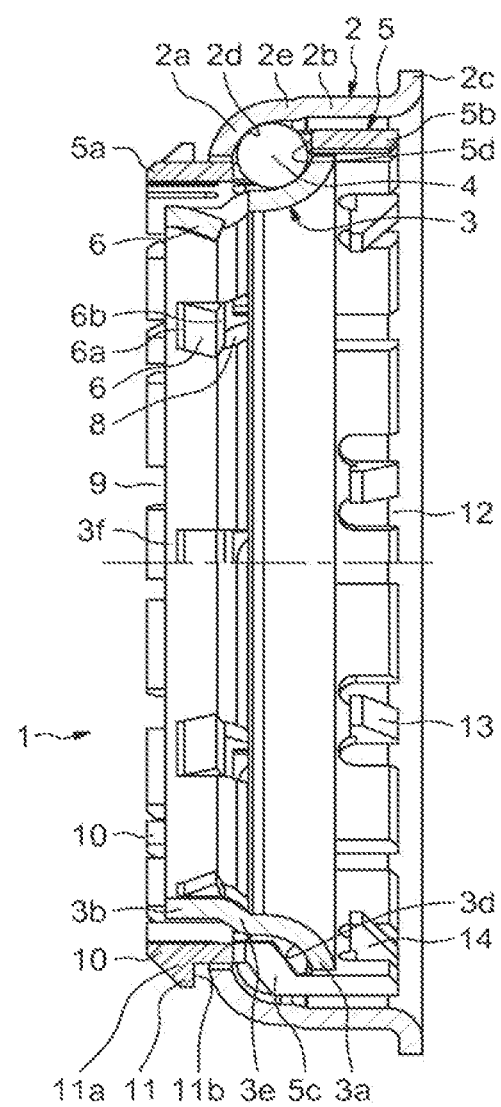
FIG. 1 is a view in section along I-I of FIG. 2 of a rolling bearing according to a first embodiment.
Figure 2:
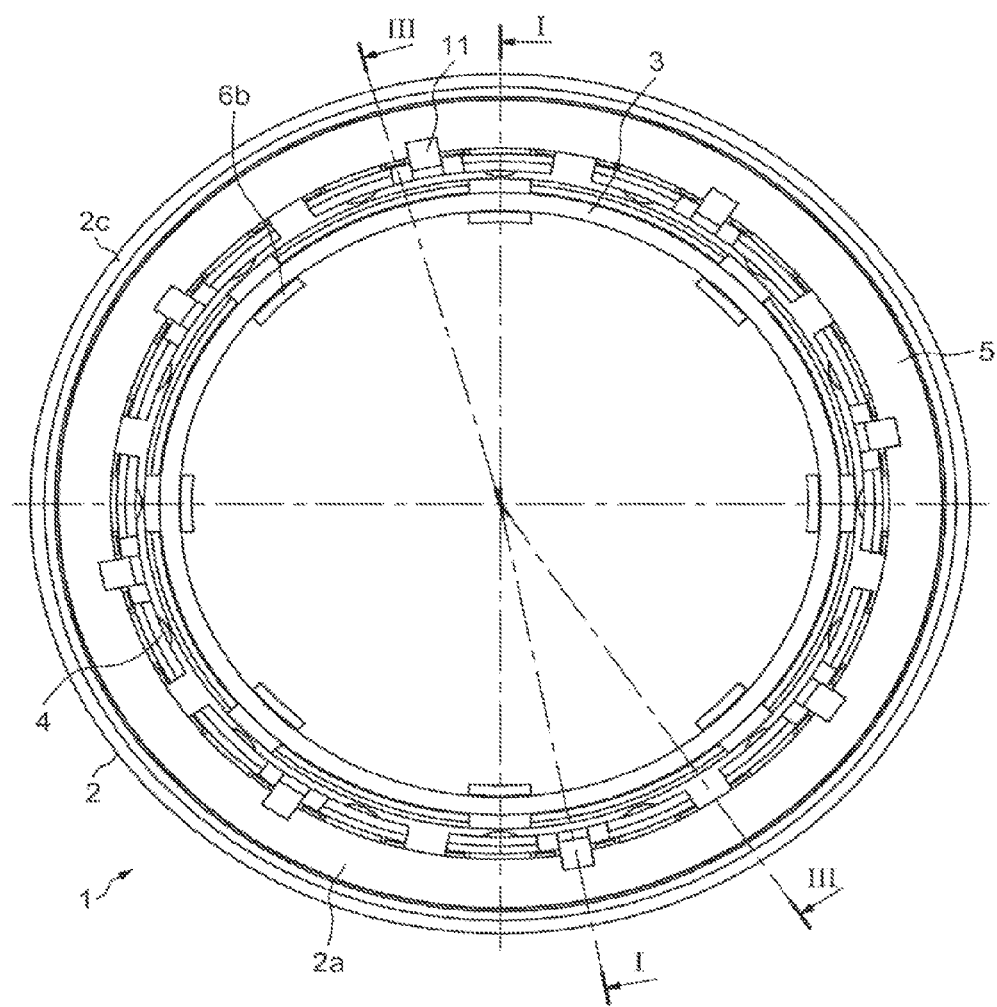
FIG. 2 is a front view in elevation of the bearing of FIG. 1.
Figure 3:
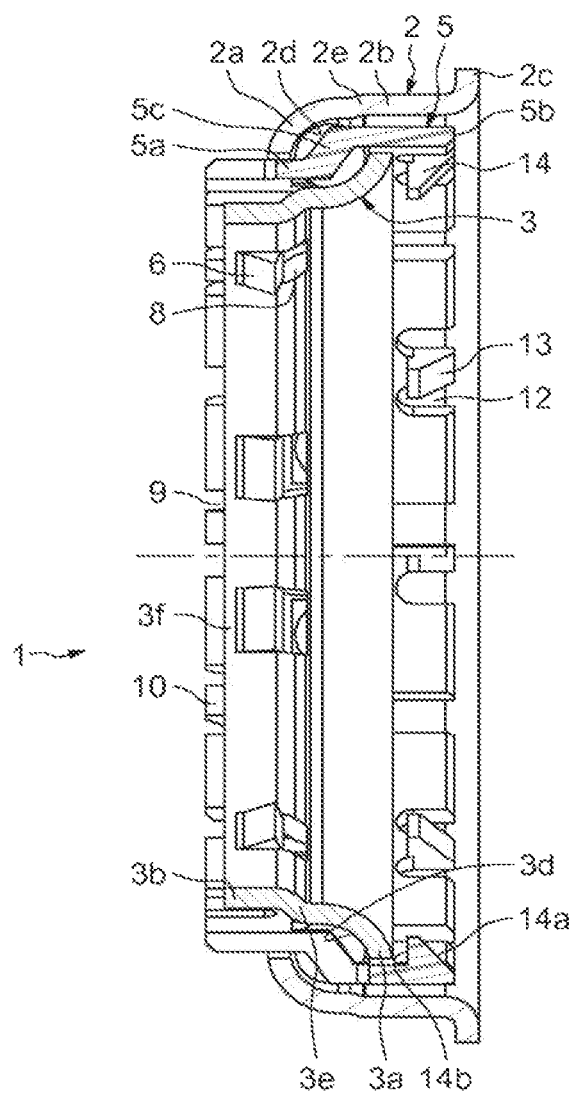
FIG. 3 is a view in section along III-III of FIG. 2 of the rolling bearing according to the first embodiment.

As illustrated in FIGS. 1 to 3, an example of a rolling bearing 1 comprises an outer race 2 and an inner race 3 between which an array of rolling elements, consisting in this instance of balls 4, is mounted. The balls 4 are held at a regular circumferential spacing by a retaining cage 5. The outer race 2 and inner race 3 are made of a thin sheet of substantially constant thickness, for example by stamping, of an electrically conductive material.

The outer race 2 comprises a toroidal portion 2a, an axial portion 2b and a radial rim 2c. The axial portion 2b is placed between the toroidal portion 2a and the radial rim 2c. The toroidal portion 2a has a concave inner surface in axial section forming a raceway 2d for the balls 4. The toroidal portion 2a may extend over an angular sector of the order of 45° to 90°.

The axial portion 2b has a slight shoulder 2e dividing it into a portion of small diameter situated in the extension of the toroidal portion 2a and a portion of larger diameter on the side of the radial rim 2c. The radial rim 2c is directed radially outwards from the axial portion 2b. The toroidal portion 2a is directed radially inwards from the axial portion 2b.

The inner race 3 comprises a toroidal portion 3a and a cylindrical portion 3b. The toroidal portion 3a forms, on its concave outer surface in axial section, a raceway 3d for the rolling elements 4. The raceway 2d is placed on one side and the raceway 3d on the other side of a radial plane passing through the centre of the rolling elements 4. The axial portion 3b of the inner race 3 is placed on the same side of the said radial plane as the toroidal portion 2a of the outer race 2. The toroidal portion 3a of the inner race 3 and the axial portion 2b of the outer race 2 are placed on the same side of the said radial plane. The rolling bearing 1 thus provides an oblique contact for the rolling elements 4 giving a capacity of absorption of the axial loads in one direction and of the radial loads. Preferably, the inner race 3 is core hardened so as to be sufficiently flexible.

The axial portion 3b may have a slight shoulder 3e dividing it into a portion of small diameter on the side of the free end of the axial portion 3b and a portion of larger diameter on the side of the toroidal portion 3a.

Figure 7:
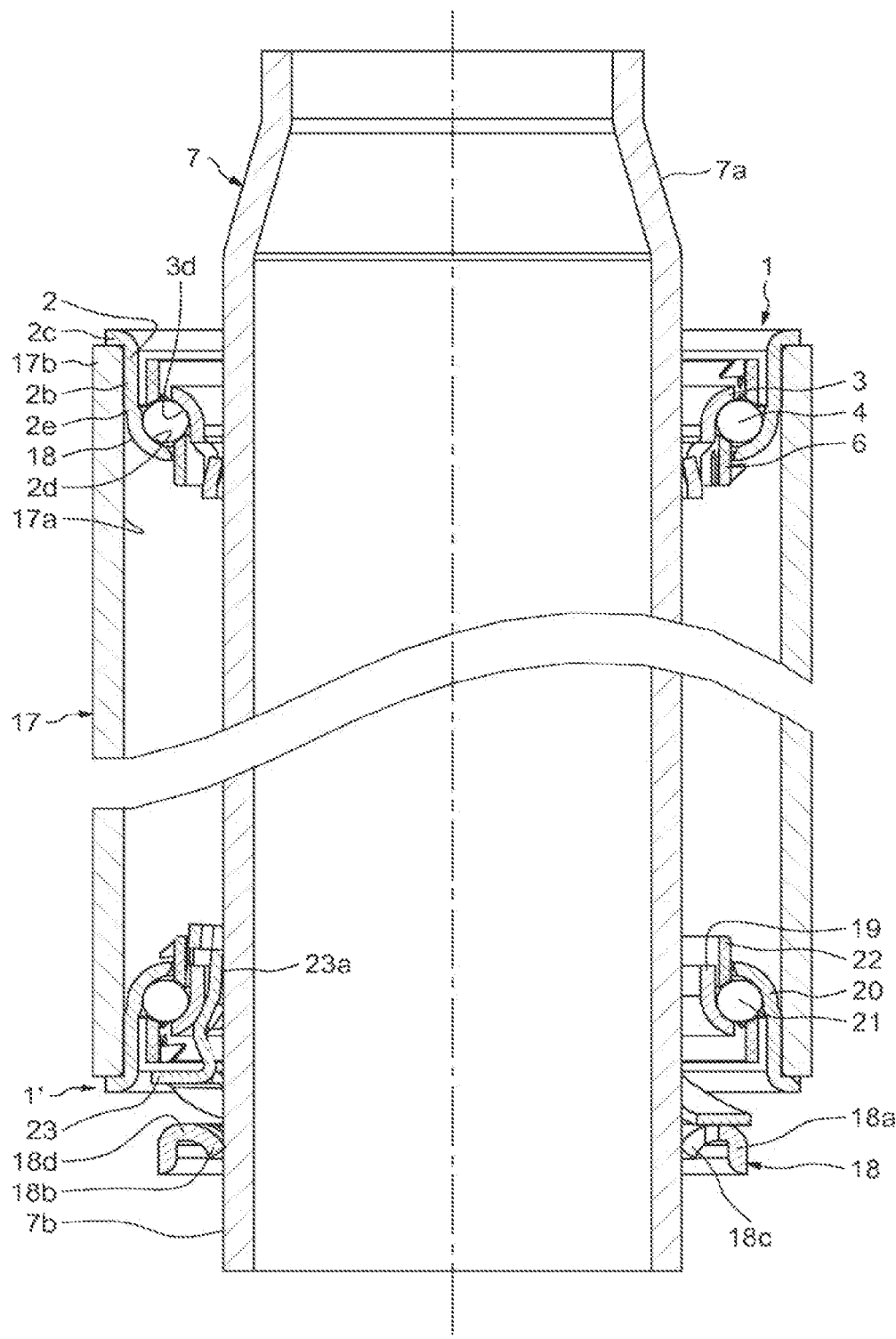
FIG. 7 is a view in longitudinal section, partially cut away, of a portion of a steering column shaft supported by two rolling bearings.
Figure 8:
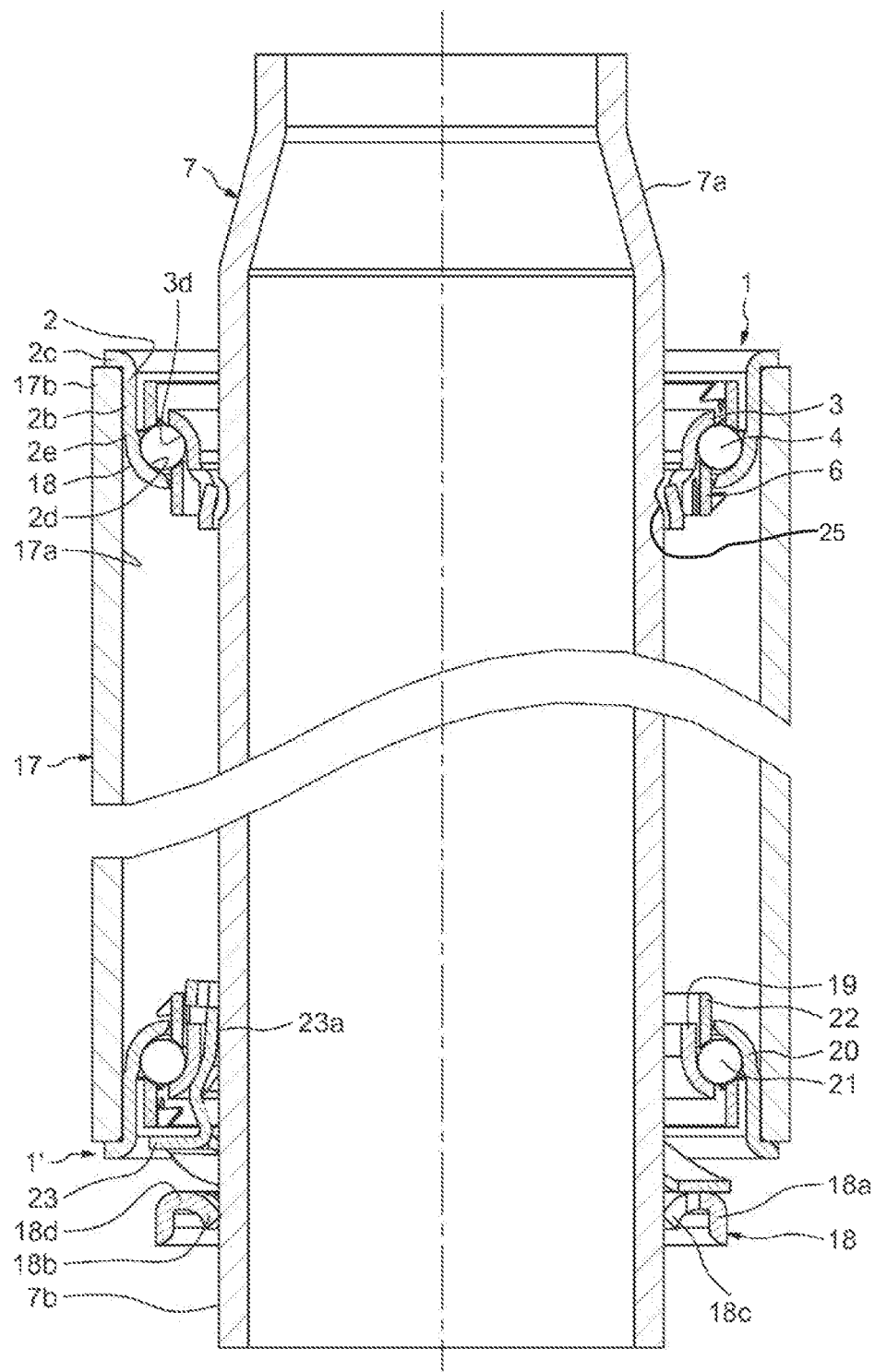
FIG. 8 is a view in longitudinal section, partially cut away, of a portion of a steering column shaft with a peripheral groove capable of supporting the two rolling bearings due to the engagement of the groove with a tongue of the inner race.

A plurality of cut-outs 8 are arranged in the axial portion 3b of the inner race 3 and are evenly distributed circumferentially. The cut-outs 8 have the general shape of a U, the bottom of which is placed on the side of the shoulder 3e. The cut-outs 8 allow a continuous annular zone 3f to remain on the side of the free end of the axial portion 3b. The cut-outs 8 delimit retaining tongues 6. The tongues 6 comprise a base portion 6a connected to the annular zone 3f and an end portion 6b directed radially inwards. The end portion 6b is designed so as to be able to come into contact with the outer surface 7b of a steering column tube or shaft 7 as illustrated in FIG. 7. The end portion 6b can also be designed to interact with a peripheral groove 25 of an inner tube or shaft 7 as illustrated in FIG. 8.

The cage 5 can be made of synthetic material, for example a polyamide optionally reinforced by a mineral filler. The cage 5 comprises an axial annular portion 5a of small diameter passing between the free end of the toroidal portion 2a of the outer race 2 and an outer surface of the axial portion 3b of the inner race 3. The cage 5 also comprises an axial annular portion 5b of large diameter placed on the opposite side, in other words passing between the free end of the toroidal portion 3a of the inner race 3 and a bore of the axial portion 2b of the outer race 2. The axial annular portions 5a and 5b extend beyond the axial ends of the inner race 3.

The cage 5 also comprises an oblique central portion 5c in which slots 5d are arranged for the rolling elements and having a frustoconical inner surface and a frustoconical outer surface. One end of the oblique portion 5c is connected to the axial annular portion 5a while the other end is connected to the portion 5b.

The annular portion 5a of small diameter is furnished with cut-outs 9 oriented axially and extending from its free end. The cut-outs 9 delimit flexible claws 10 each furnished on their outer surface with a hook 11. The hooks 11 have, in the free state, an outer diameter greater than the minimum diameter of the outer race 2. The hooks 11 therefore form means for axially holding the cage 5 on the outer race 2. The hooks 11 can be furnished with an oblique surface 11a for the purpose of engagement in the outer race 2 and with a substantially radial surface 11b for the purpose of holding on the outer race 2.

According to the first embodiment illustrated in FIGS. 1 to 3, the large-diameter annular portion 5b of the cage 5 is furnished with cut-outs 12 oriented axially and extending from its free end. The cut-outs delimit flexible claws 13 each furnished on their outer surface with a hook 14. The hooks 14 have, in the free state, a smaller diameter than the maximum diameter of the inner race 3. The hooks 14 therefore form means for axially holding the cage 5 on the inner race 3. The hooks 14 may be furnished with an oblique surface 14a for the purpose of engagement in the inner race 3 and with a substantially radial surface 14b for the purpose of holding on the inner race 3.

The assembly of the bearing 1 can be carried out in the following manner. The rolling elements 4 are placed in the slots 5d of the cage 5 and then the outer race 2 is brought in by applying an axial pressure so that the hooks 11 of the cage 5 move aside inwards and pass over the small-diameter end of the outer race 2. A subassembly is thus formed by the outer race 2, the rolling elements 4 and the cage 5. The inner race 3 is then brought in. The hooks 14 of the cage 5 move aside radially outwards and pass over the large-diameter end of the inner race 3. The inner race 3 is thus held, thus ensuring that the rolling bearing 1 cannot be removed.

Figure 4:
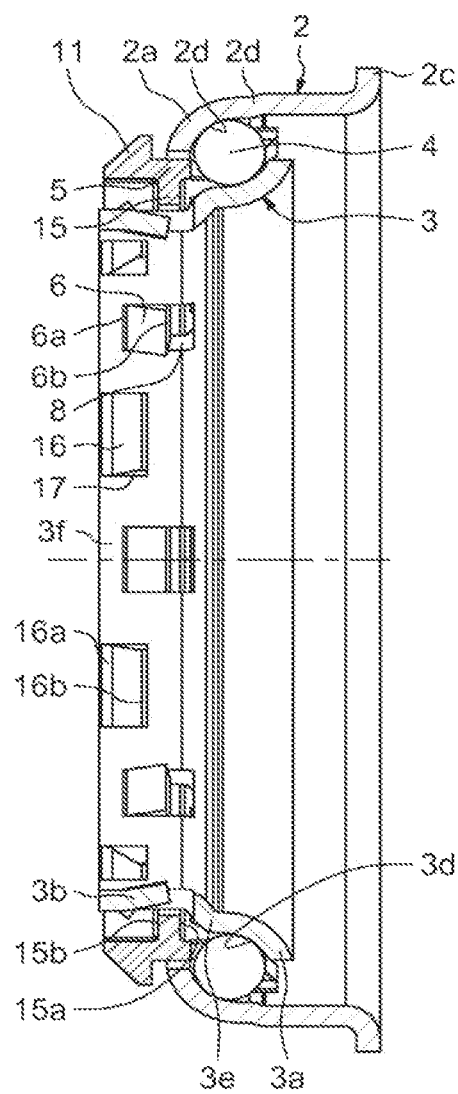
FIG. 4 is a view in section similar to FIG. 1 along IV-IV of FIG. 5 of a rolling bearing according to a second embodiment.
Figure 5:
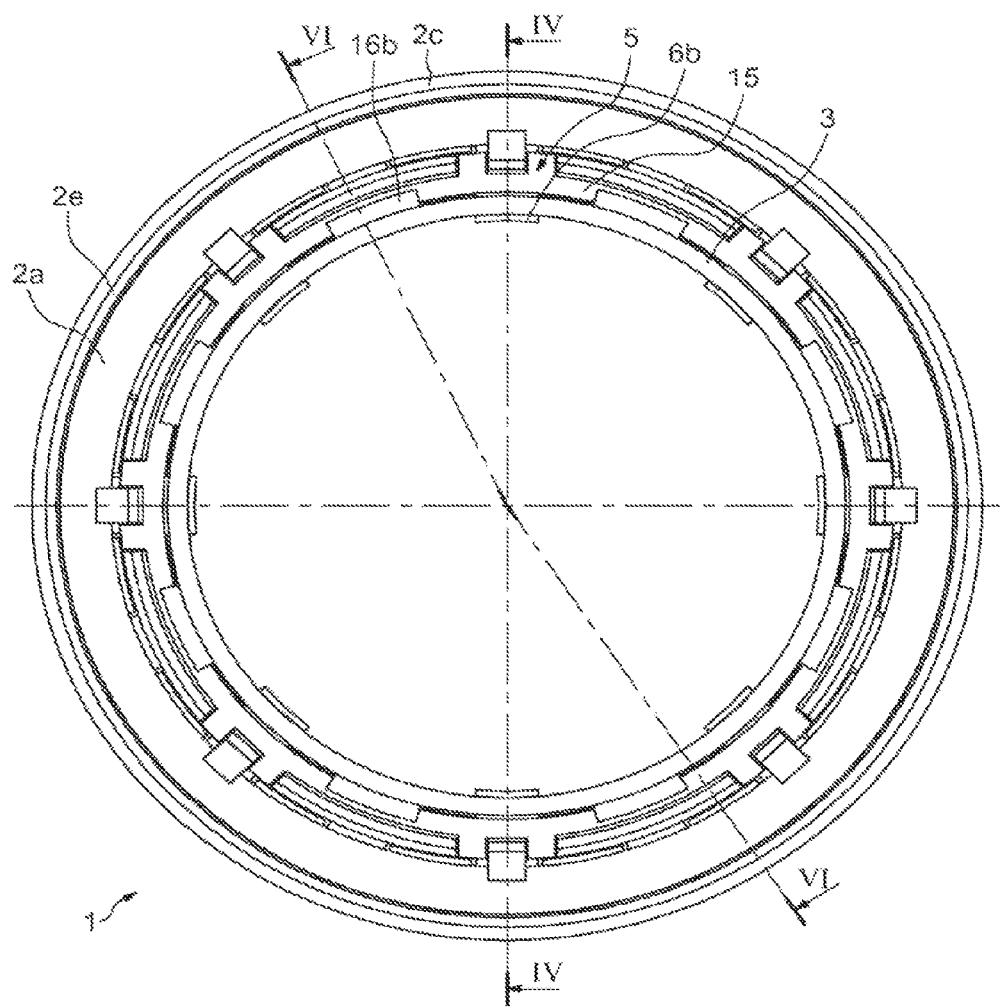
FIG. 5 is a front view in elevation of the bearing of FIG. 4.
Figure 6:
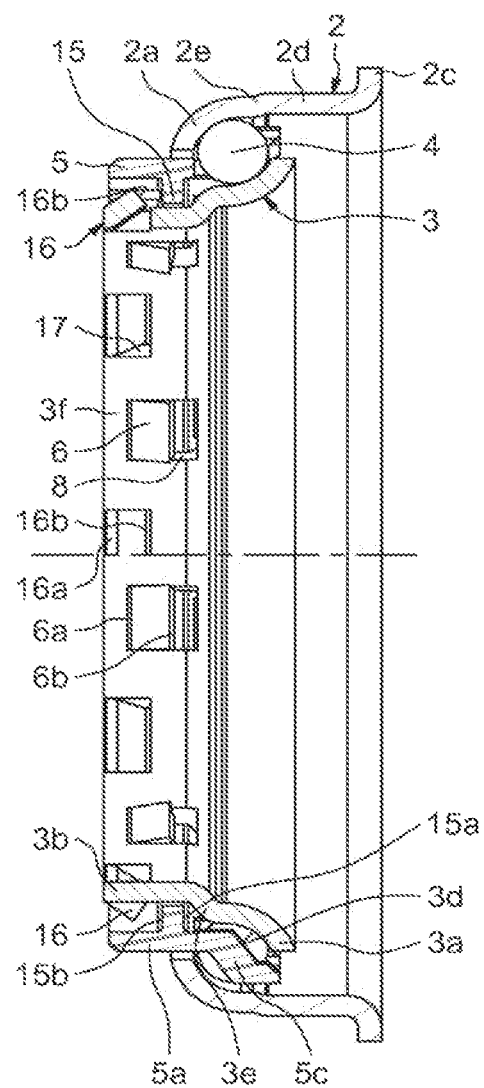
FIG. 6 is a view in section similar to FIG. 3 along VI-VI of FIG. 5 of a rolling bearing according to the second embodiment.

In a second embodiment illustrated in FIGS. 4 to 6, the references of similar elements have been retained. This embodiment differs from the preceding embodiment in that the cage 5 no longer comprises an annular portion 5b furnished with hooks 14 so as to hold it onto the inner race 3. Instead of this, the cage 5 has an annular lug 15 directed radially inwards, axially substantially at the same level as the hooks 11, or even slightly closer to the rolling elements 4. The radial annular lug 15 has two opposite radial surfaces, one surface 15a facing the shoulder 3e of the inner race 3 and the other surface 15b facing the retaining tongues 16 made on the inner race 3. As a variant, the annular lug 15 may take the form of annular rib segments interrupted at the level of the tongues 16.

U-shaped cut-outs 17 delimiting the tongues 16 are arranged in the continuous annular zone 3f on the side of the free end of the axial portion 3b of the inner race 3 and are evenly distributed circumferentially. The cut-outs 17 have shapes that are identical to the cut-outs 8 of the axial portion 3b and the bottom of the U-shape is also placed on the side of the shoulder 3e. The tongues 16 comprise a base portion 16a connected to the free end of the annular zone 3f and an end portion 16b directed radially outwards. The end portion 16b is designed to be in contact with the radial surface 15b of the annular lug 15 so as to axially hold the cage 5 relative to the inner race 3.

This second embodiment makes it possible to reduce the axial dimension of the cage 5 because of the removal of the annular portion 5b so as to release space behind the bearing in order to allow a lock washer (not shown) to be installed which can come into contact on the one hand with the outer surface 7b of the shaft 7 of a steering column and, on the other hand with the inner race 3. Specifically, in this case, on one side of the bearing, the cage 5 is axially set back relative to the free end of the inner race 3.

According to this embodiment, the bearing can be assembled in the following manner. The rolling elements 4 are placed in the slots 5d of the cage 5 and then the outer race 2 is brought in while applying axial pressure so that the hooks 11 of the cage 5 move aside inwards and pass over the small-diameter end of the outer race 2. A subassembly is thus formed by the outer race 2, the rolling elements 4 and the cage 5. The inner race 3 is then brought in. The tongues 16 of the inner race 3 move aside radially inwards and pass over the end of the annular lug 15 of the cage 5; the tongues 16 then resume their rest position. When they make contact with the tongues 16, the lug or lugs 15 of the cage 5 can be made to move radially outwards, thus limiting the inward deformation of the tongues 16. In order to limit the deformation of the cage, it is preferable to produce the tongues 16 so that their zone of junction with the annular zone 3f of the inner race 3 is sufficiently flexible, all the deformations preferably being elastic. The inner race 3 is thus held, thus ensuring that the rolling bearing cannot be removed.

As illustrated in FIG. 7, a steering column for a motor vehicle comprises an inner hollow tubular shaft 7 on which a steering wheel (not shown) can be mounted on a portion 7a of smaller diameter of the shaft 7. The shaft 7 is associated with an outer tube 17 which is positioned coaxially around the inner shaft 7. The outer tube 17 is supported on the inner shaft 7 by means of two rolling bearings 1 and 1', one close to the portion 7a having a structure disclosed in FIGS. 1 to 3 of the first embodiment, the other on the opposite side to the portion 7a having a different structure.

The outer tube 17 comprises a bore 17a and a radial lateral surface 17b. The axial portion 2b of the outer race 2 of the bearing 1 is fitted into the bore 17a, in particular in its large-diameter portion situated between the slight shoulder 2e and the radial rim 2c. The radial rim 2c comes into contact with the lateral surface 17b which makes it possible to define with precision the axial position of the rolling bearing 1. The slight shoulder 2e makes it possible to leave a small radial annular space 18 between the outer race 2 and the bore 17a at the rolling elements 4.

When the bearing 1 is mounted onto the inner shaft 7, the subassembly consisting of the outer race 2, the rolling elements 4 and the cage 5 is positioned between the shaft 7 and the outer tube 17. It is then sufficient to axially push the inner race 3, the end portions 6a of the tongues 6 of the inner race 3 then deforming radially outwards by bending from their root and clamping themselves again on the outer surface 7b of the shaft 7, thus allowing a good axial attachment of the bearing 1 relative to the inner shaft 7.

It can be envisaged to provide a peripheral groove (not shown) on the outer surface of the inner shaft 7 in order to interact with the retaining tongues 6 of the inner race 3 of the rolling bearing 1 so as to increase their inclination and thus increase the effectiveness of the hold of the bearing 1 on the shaft 7.

The rolling bearing 1' comprises an inner race 19, an outer race 20, rolling elements 21, a cage 22 and a corrugated and flat retention member 23 by virtue of which the bearing 1' is held in position on the shaft 7. Tongues 23a made on the retention member 23 axially hold the inner race 19 before the rolling bearing 1' is mounted on the shaft 7.

The rolling bearing 1' is then axially pressed against the outer tube 17 by a lock washer 18 which comprises an axial portion 18a and a substantially conical portion 18b with a plurality of tongues 18c in contact with the outer surface 7b of the inner shaft 7. By applying an axial force towards the inside of the outer tube 17, the lock washer 18, by means of a substantially radial surface 18d, is capable of coming into contact with the retention member 23 of the rolling bearing 1' so as to radially press the tongues 23a against the inner shaft 7 and thus to hold the rolling bearing 1' in position between the inner shaft 7 and the outer tube 17.

The invention provides the benefit of a rolling bearing of relatively simple shape with a limited number of parts and low-cost manufacture. Specifically, the bearing comprises an inner race furnished with tongues capable of making direct contact with the inner shaft of a steering column and a cage comprising means for axially holding the cage relative to the inner race. The inner and outer races can be manufactured by stamping a flank of thin metal sheet so as to allow a low-intensity current to pass through, notably in order to prevent the creation of electric arcs that may trigger airbag systems. The rolling bearing may form a unitary assembly, notably by virtue of the interaction of the cage with the inner race and also comprises simply-shaped parts that can be manufactured in large production runs at low cost.

The invention claimed is:

1. A rolling bearing device for a motor vehicle steering column, comprising:
    an outer race having a toroidal portion,
    an inner race having a toroidal portion,
    rolling elements disposed between the respective toroidal portions of the outer race and inner race, and wherein
    the inner race comprising a plurality of retaining tongues directed radially inwards and extending radially inwards farther than any other portion of the inner race, suitable for coming into contact with a tube or a shaft, and wherein
    the retaining tongues are defined by cut-outs arranged in an axial portion of the inner race such that the retaining tongues are not located on an axial end of the inner race and are completely between both axial ends of the inner race, said axial portion being placed on the same side of a radial plane passing through the centre of the rolling elements than the toroidal portion of the outer race.

2. The device according to claim 1, further comprising a cage for retaining the rolling elements, provides at least one first hook for axially holding the cage relative to the outer race.

3. The device according to claim 2, wherein the cage provides at least one second hook for axially holding the cage relative to the inner race.

4. The device according to claim 3, wherein the cage has a first axial annular portion wherein the first hooks are made and a second annular portion axially opposite to the first and in which the second hooks are made.

5. The device according to claim 1, wherein the inner race is made of an electrically conductive material.

6. The device according to claim 1, wherein the inner race is formed by stamping a flank of thin metal sheet.

7. A motor vehicle steering column comprising an outer tube and at least one of an inner tube and a shaft, wherein at least one rolling bearing device according to claim 1 is configured to be mounted between the said inner tube or the shaft and the outer tube.

8. The steering column according to claim 7, wherein one of the inner tube and shaft has a peripheral groove capable of interacting with the retaining tongues of the inner race of the rolling bearing device.

9. A rolling bearing device for a motor vehicle steering column, comprising:
    an outer race having a toroidal portion,
    an inner race having a toroidal portion,
    rolling elements disposed between the respective toroidal portions of the outer race and inner race,
    the inner race comprising a plurality of retaining tongues directed radially inwards and suitable for coming into contact with a tube or a shaft,
    the retaining tongues are defined by cut-outs arranged in an axial portion of the inner race, said axial portion being placed on the same side of a radial plane passing through the center of the rolling elements than the toroidal portion of the outer race, a cage for retaining the rolling elements, provides at least one first hook for axially holding the cage relative to the outer race, wherein the cage has an annular lug directed radially inwards and interacting, for the axial retention of the inner race, with at least one retaining tongue made on the inner race.

10. The device according to claim 9, wherein the cage has an axial annular portion in which the first hooks are made.

11. The device according to claim 9, wherein the inner race has an axial annular portion in which the retaining tongues are made.

* * * * *